Dec. 10, 1968   R. H. McMILLAN   3,415,338
ANTI-WHISTLE PIPE CONNECTION
Filed Jan. 23, 1967

INVENTOR
ROBERT H. McMILLAN
BY
Trask, Jenkins & Hanley
ATTORNEYS

United States Patent Office 3,415,338
Patented Dec. 10, 1968

3,415,338
ANTI-WHISTLE PIPE CONNECTION
Robert H. McMillan, Columbus, Ind., assignor to Arvin Industries, Inc., Columbus, Ind., a corporation of Indiana
Filed Jan. 23, 1967, Ser. No. 611,035
7 Claims. (Cl. 181—59)

ABSTRACT OF THE DISCLOSURE

An anti-whistle connection between a gas-carrying pipe and a second pipe or tube connected thereto at an opening formed in the wall of said gas-carrying pipe in which a transverse projection is provided adjacent the upstream end of the opening to project into the gas-carrying pipe to prevent the gas stream from whistling as it passes over said opening.

Background of the invention

This invention relates to an anti-whistle pipe connection, and more particularly to such a connection for connecting an exhaust gas-carrying pipe to another pipe.

In the design of automotive exhaust systems it is frequently necessary to connect quarter wave tubes or side branch chambers to the pipe carrying the exhaust gases. Such a connection requires an opening to be formed in the gas-carrying pipe with the quarter wave tube or side branch chamber being connected to the gas-carrying pipe thereat. The exhaust gases passing over the opening, however, create a whistling noise of sufficient amplitude to be undesirable. It is an object of this invention to provide a means for preventing this whistling noise.

Summary of the invention

In accordance with one form of the invention, there is provided an exhaust gas-carrying pipe having a quarter wave tube connected thereto at an opening formed in said pipe. A tongue is mounted in said tube and projects into said pipe at the upstream edge of said opening to disturb the flow of gases in the area of the opening and thus prevent the gases from whistling as they pass over said opening.

Other objects and features of the invention will become apparent from the more detailed description which follows and from the accompanying drawings in which.

Detailed description

Figure 1:
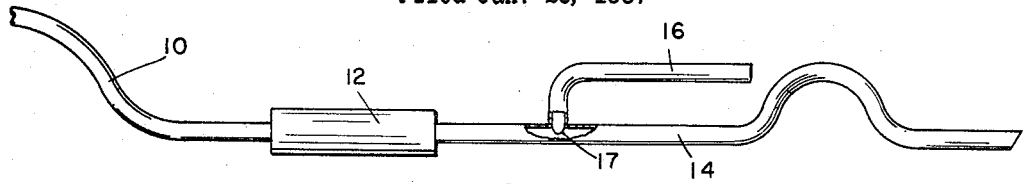
FIG. 1 is a fragmentary side elevation of an automotive exhaust system with portions thereof being broken away to show a pipe connection embodying the invention.

As shown in FIG. 1, a typical automotive exhaust system may employ an exhaust pipe 10 connected at its upstream end to an exhaust manifold (not shown) and at its downstream end to the inlet of a muffler 12. A tail pipe 14 is connected to the muffler outlet and terminates at a suitable gas discharge point. In the system illustrated, a quarter wave tube 16 is connected to the tail pipe 14 through an opening 17 formed in the wall of said pipe.

Figure 2:
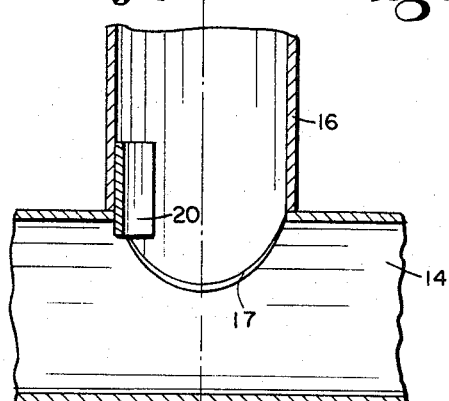
FIG. 2 is an enlarged fragmentary axial section of the pipe connection shown in FIG. 1.
Figure 3:
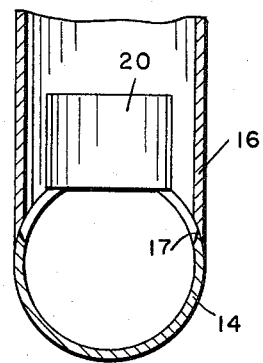
FIG. 3 is a transverse section taken on line 3—3 of FIG. 2.

The exhaust gases passing over the opening 17 create a whistling noise. As shown in FIGS. 2 and 3, to prevent such whistling, I mount an arcuate tongue 20 in the inlet end of tube 16 which projects slightly inwardly through opening 17 and is disposed transversely to the gas stream flowing through pipe 14. As shown, the tongue 20 is mounted in tube 16 to project through opening 17 at the upstream end thereof. This causes said tongue to disrupt the flow of gas over the opening and prevent any whistling.

Figure 4:
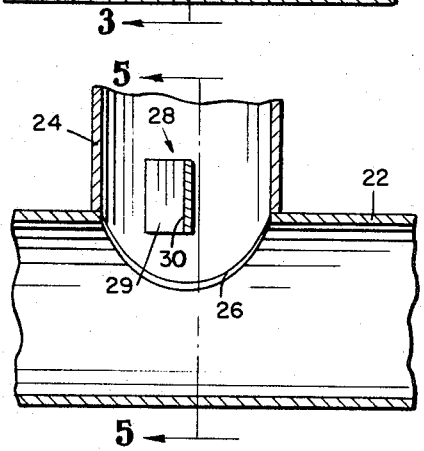
FIG. 4 is a fragmentary axial section of a pipe connection showing another embodiment of the invention.
Figure 5:
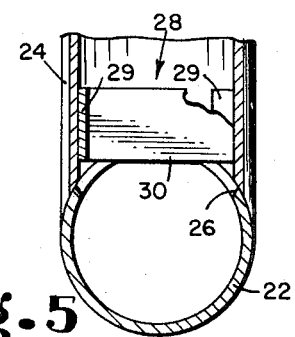
FIG. 5 is a transverse section taken on line 5—5 of FIG. 4.

In the embodiment illustrated in FIGS. 4 and 5 the gas-carrying pipe 22 is connected to a second pipe 24 with the two pipes being disposed in open communication with each other through the opening 26 formed in pipe 22. In order to prevent the gases from whistling as they pass over the opening 26, I mount a generally Z-shaped sheet-metal stamping 28 in the pipe 24. Said stamping comprises a pair of flanges 29 connected to the inner wall of pipe 24 and interconnected by a web 30 forming a tongue which projects through the opening 26 and is disposed transversely to the gas stream flowing through pipe 22. As shown, the web 30 extends across the central portion of the opening 26 whereby the flow of the gases through pipe 22 will be disturbed before said gases pass over the downstream portion of said opening.

Figure 6:
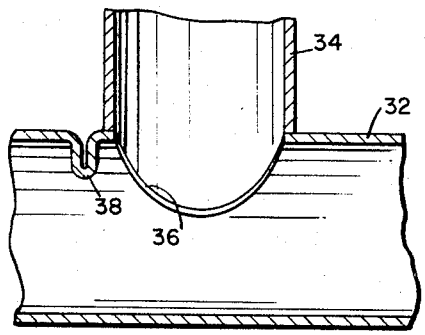
FIG. 6 is a fragmentary axial section of a pipe connection showing another embodiment of the invention.

Still another embodiment of the invention is illustrated in FIG. 6 wherein the gas-carrying pipe 32 is connected to a second pipe 34 with the two pipes being disposed in open communication through the opening 36 formed in pipe 32. In order to prevent the gases from whistling as they pass over the opening 36, pipe 32 is deformed inwardly, as at 38, immediately adjacent the upstream end of said opening thereby creating a transverse obstruction in pipe 32 disrupting the gas flow over said opening.

Figure 7:
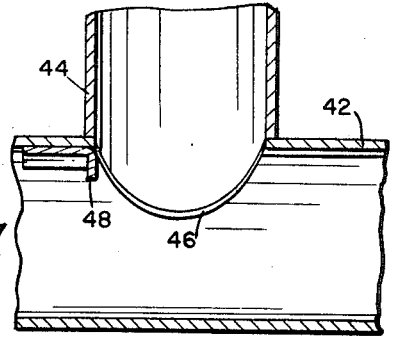
FIG. 7 is a fragmentary axial section of a pipe connection showing another embodiment of the invention.

Still another embodiment is illustrated in FIG. 7 wherein the gas-carrying pipe 42 is connected to a second pipe 44 with the two pipes being disposed in open communication through the opening 46 formed in pipe 42. In order to prevent the gases from whistling as they pass over the opening 46, an L-shaped stamping is mounted in pipe 42. As shown, said stamping has a transverse tongue 48 projecting inwardly into pipe 42 at the upstream end of opening 46 and disrupting the gas flow over said opening.

In each of the embodiments, the tongue has been shown as being disposed at a 90° angle to the axis of the gas-carrying pipe. It can, however, be at any angle in the range of from about 85° to about 105° of said pipe axis and prevent the gases from whistling over the pipe opening. It has also been illustrated as projecting into the gas-carrying pipe a distance equal to about 10% of the diameter of said pipe. If it projects a substantially shorter distance into the gas-carrying pipe, it will not prevent the gases from whistling over the pipe connection opening. Conversely, if it projects a substantially longer distance the gases will create a hissing noise as they pass over the opening. Furthermore, if such longer tongues are employed, they will create undesirable back pressures upstream from the pipe connection.

I claim:

1. A pipe connection, comprising a gas-carrying pipe having an opening formed in its side wall, a second pipe connected to said gas-carrying pipe at said opening and projecting outwardly from said side wall, and means projecting into said gas-carrying pipe adjacent the upstream end of said opening transversely across a portion of said gas-carrying pipe for disrupting the flow of gas through said gas-carrying pipe over said opening, said means projecting into said gas-carrying pipe at a distance limited to approximately 10% of the diameter of said gas-carrying pipe.

2. A pipe connection, comprising a gas-carrying pipe having an opening formed in its wall, a second pipe connected to said gas-carrying pipe at said opening, and a tongue mounted in said second pipe and projecting into said gas-carrying pipe transversely thereof adjacent the upstream end of said opening for disrupting the flow of gas over said opening.

3. The invention as set forth in claim 2 in which said tongue is mounted on the upstream wall of said second pipe.

4. The invention as set forth in claim 2 in which said tongue constitutes the web of a generally Z-shaped flange extending across said second pipe, said web interconnecting a pair of flanges connected to the wall of said second pipe.

5. The invention as set forth in claim 4 in which said web extends across the upstream portion of said opening.

6. A pipe connection, comprising a gas-carrying pipe having an opening formed in its wall, a second pipe connected to said gas-carrying pipe at said opening, and a transverse deformation formed in said gas-carrying pipe and projecting into said gas-carrying pipe at the upstream end of said opening for disrupting the flow of gas over said opening.

7. A pipe connection, comprising a gas-carrying pipe having an opening formed in its wall, a second pipe connected to said gas-carrying pipe at said opening, and a stamping mounted in said gas-carrying pipe and having a tongue projecting into said gas-carrying pipe immediately adjacent said second pipe for disrupting the flow of gas over said opening.

References Cited

UNITED STATES PATENTS

| 1,938,973 | 12/1933 | Oldberg. |
| 2,075,263 | 3/1937 | Bourne. |
| 2,160,332 | 5/1939 | Huber. |
| 2,297,046 | 9/1942 | Bourne. |

FOREIGN PATENTS

| 1,194,562 | 5/1959 | France. |
| 188,954 | 5/1937 | Switzerland. |

ROBERT S. WARD, Jr., *Primary Examiner.*

U.S. Cl. X.R.

181—63, 69